United States Patent [19]

Vescial

[11] Patent Number: 4,514,832
[45] Date of Patent: Apr. 30, 1985

[54] SINGLE MIRROR RING LASER GYRO READOUT WITHOUT COMBINING OPTICS

[75] Inventor: Frederick Vescial, Orange, Calif.

[73] Assignee: Rockwell International Corporation, El Segundo, Calif.

[21] Appl. No.: 421,762

[22] Filed: Sep. 23, 1982

[51] Int. Cl.[3] .............................................. G01C 19/64
[52] U.S. Cl. .................................................... 356/350
[58] Field of Search ........................................ 356/350

[56] References Cited

U.S. PATENT DOCUMENTS 4,152,072 5/1979 Hutchings ........................... 356/350

Primary Examiner—Vincent P. McGraw
Attorney, Agent, or Firm—H. Fredrick Hamann; James F. Kirk

[57] ABSTRACT

A detector structure for use in a ring laser gyroscope includes a partially reflective surface on an inside face of a carrying substrate for passing a portion of each of the counter rotating gyroscope beams for detection and for reflecting a portion of each of the beams into a light path of the laser gyroscope without passing any optical elements of the detector structure. A detector substrate is spaced with respect to said partially reflective surface to receive the portions of the beams passing the partially reflective surface with patterns formed by the respective beams only partially overlapping. A pair of detectors are provided on the detector substrate, located to receive at least a nonoverlapping portion of each of the beam patterns to provide an intensity indication of the respective beams, and another detector is also located on the substrate, located to receive an overlapping portion of the beams for detecting the rate and sense of motion of interference fringes produced by the respective beams to provide an indication of the frequency difference between said beams. The detector structure also includes yet another detector on the substrate, located to receive an overlapping portion of the beams to provide an indication of the sum of the intensities of the respective beams.

12 Claims, 5 Drawing Figures

SINGLE MIRROR RING LASER GYRO READOUT WITHOUT COMBINING OPTICS

BACKGROUND OF THE INVENTION

1. Field of the Invention

This invention relates to improvements in ring laser gyroscopes, and more particularly, to improvements in output optics and detectors for use in ring laser gyroscopes.

2. Description of the Prior Art

As is known in the art, a ring laser gyroscope is a nonconventional gyroscope in which laser light is circulated in counter rotating directions in a ring about an axis of rotational sensitivity. Depending upon the rate of rotation of the ring about the axis, the counter rotating light beams effectively change in frequency. Ordinarily, an output is derived from the gyroscope at a reflective corner of the ring to determine the intensities of the counter rotating beams. An example of this output derivation is shown in U.S. Pat. No. 3,411,849. Additionally, ordinarily at another reflective corner, another output is derived in which the beams are superimposed to develop interference fringes indicative of the frequency difference of the counter rotating beams. Thus, ordinarily separate detectors (not shown) are employed to detect the intensities of the respective counter rotating beams.

Numerous types of output optics and detectors have been suggested for use in developing outputs from ring laser gyroscopes. One optics-detector arrangement of the prior art is taught by D. M. Thymian and T. J. Podgorski, ASTIA Document AD 527867, GG1300AD01, Laser Gyro Final Report, May, 1973, pp. 7-8. Another reference showing laser gyroscope output techniques is Laser Applications, "The Laser Gyro", Vol. 1, 1971, Academic Press, pp. 138-141. Another gyroscope detector which has been advanced is described in U.S. Pat. No. 4,152,072, and is denoted generally by the reference numeral 10, as shown in FIG. 1.

The detector structure 10 includes a substrate 11 on which is carried a detector layer 12. The substrate 11 has an anti-reflection coating 15 on the front face and a multilayer dielectric reflection coating 16 on its back face. Typically, the multilayer dielectric reflection coating 16 serves as a partially reflecting mirror, allowing a portion of the light incident thereupon to pass through to the detector layer 12, and reflecting the remaining portion of the incident light back into the ring. To enable the detector 10 to detect the fringes developed, (interference fringes between the two counter-rotating beams being developed on the detector 12 as is known in the art) a mask layer 18 is provided between the detector element 12 and the multilayer dielectric coating 16. Finally, anti-reflection isolators 19 and 20 are located on each side of the mask 18.

In the operation of the detector structure 10, a fringe pattern is developed on the detector element or layer 12, dependent, in part, upon the angle, $\theta$, between the two counter rotating beams following the light path 23. The fringe pattern is made up of a portion of the light passing through the partially reflective surface 16, as described above. It can be seen that the reflection of the counter rotating beams is from the back face (as seen from the interior of the cavity) of the substrate 11 at its interface with the multilayer dielectric reflection coating 16, in a fashion such that the patterns produced upon the detector 12 through the mask 18 are in substantial registration.

One of the disadvantages of the arrangement exemplified by the structure 10 is that the light within the ring is caused to pass through both the anti-reflection coating 15 and the substrate 11 before being reflected from the partially reflective surface 16. In ring laser gyroscopes, it is important to minimize the losses within the ring as much as possible, so the passage of the light through these portions of the detector structure is regarded as being undesirable.

In summary, ring laser gyroscopes of the type exemplified by the structure illustrated in FIG. 1 have several disadvantages. The mirror substrate is inside the ring laser gyroscope cavity and thus contributes to cavity loss. Substrate thermal capacity may also adversely affect the thermal response time for the instrument. Also, the anti-reflection coating required on the front surface of the mirror substrate adds to cavity loss, may be required to withstand a gas discharge, and introduces more cost. Additionally, ring laser gyroscope single beam intensities are not available from this type mirror using the FIG. 1 mechanization. The single beam signals contain much information which may be used to predict, and perhaps even control, gyroscope performance. See, for example, U.S. Pat. No. 4,152,071. Comparison of the two single beam signals yields data on the differential intensity shift between the two beams produced during passage through lock-in; it also provides data on the phase relationship between the amplitude modulations on the two beams.

In contradistinction to the prior art gyroscopes which, as mentioned, derive outputs from a plurality of reflective corners of the ring (except for that taught in U.S. Pat. No. 4,152,072, but which does not derive single beam intensity signals), in my copending patent application, Ser. No. 410,790, filed Aug. 23, 1982, and entitled Ring Laser Gyroscope Readout assigned to the assignee hereof, and incorporated by reference herein, a ring laser gyroscope is described in which all of the required or necessary outputs are derived from a single reflective corner. It is for use in such instances that the detector of the present invention is directed.

BRIEF DESCRIPTION OF THE DRAWING

The invention is illustrated in the accompanying drawing in which.

In the drawing, the sizes and dimensions of the various parts have been exaggerated or distorted for clarity of illustration and ease of description. In the various Figures of the drawing, like reference numerals are used to denote like or similar parts.

BRIEF DESCRIPTION OF THE INVENTION

In light of the above, it is therefore, an object of the invention to provide an improved ring laser gyroscope detector.

It is another object of the invention to provide a ring laser gyroscope detector of the type described from which signals representing the respective intensities of each individual counter rotating light beam, the sum of the two counter-rotating beams, and the frequency difference therebetween can be developed in a single structure.

It is yet another object of the invention to provide a detector of a type described for use in ring laser gyroscope of simplified construction.

These and other objects, features and advantages will become apparent to those skilled in the art from the following detailed description when read in conjunction with the accompanying drawings and appended claims.

The invention, in its broad aspect, presents a detector structure for use in a ring laser gyroscope of the type having counter rotating light beams exhibiting a frequency difference indicating the rate of rotation of the gyroscope about an axis of rotational sensitivity. The detector structure includes a partially reflective surface for reflecting a portion of each of the counter rotating beams into the light path of the gyroscope as well as passing a portion of each of the beams through the surface for detection. A detector element is spaced with respect to the partially reflective surface to receive the portions of the light beams passing the partially reflective surface, with the patterns formed by the respective beams on the element only partially overlapping. A first detector means is located on the detector element to receive at least a nonoverlapping portion of each of the beam patterns to provide an intensity indication of the respective beams, and a second detector means is located on the detector element to receive at least an overlapping portion of the beams to detect the motion of the interference fringes produced by the respective beams to provide an indication of at least a frequency difference between the beams.

DETAILED DESCRIPTION OF THE THE PREFERRED EMBODIMENTS

Figure 1:
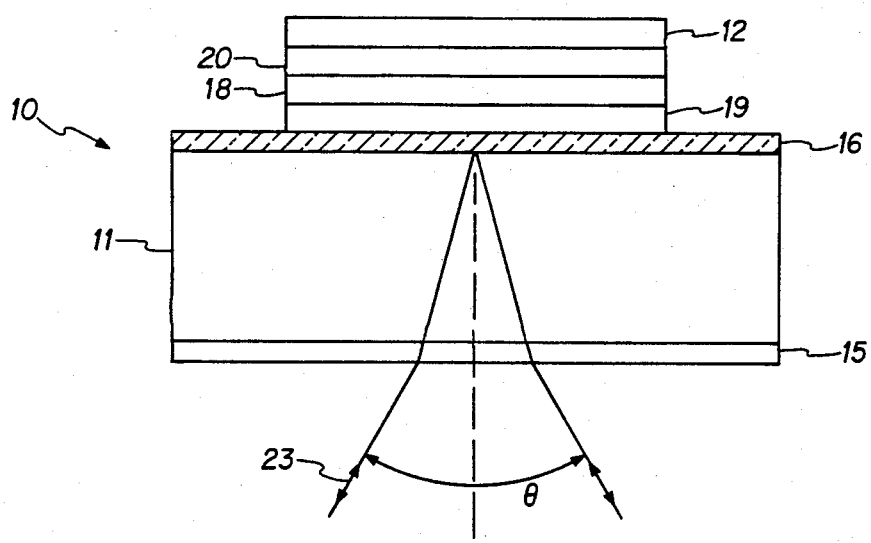
FIG. 1 is a side elevational view of a detector structure of the prior art for use in developing an output from a ring laser gyroscope.
Figure 2:
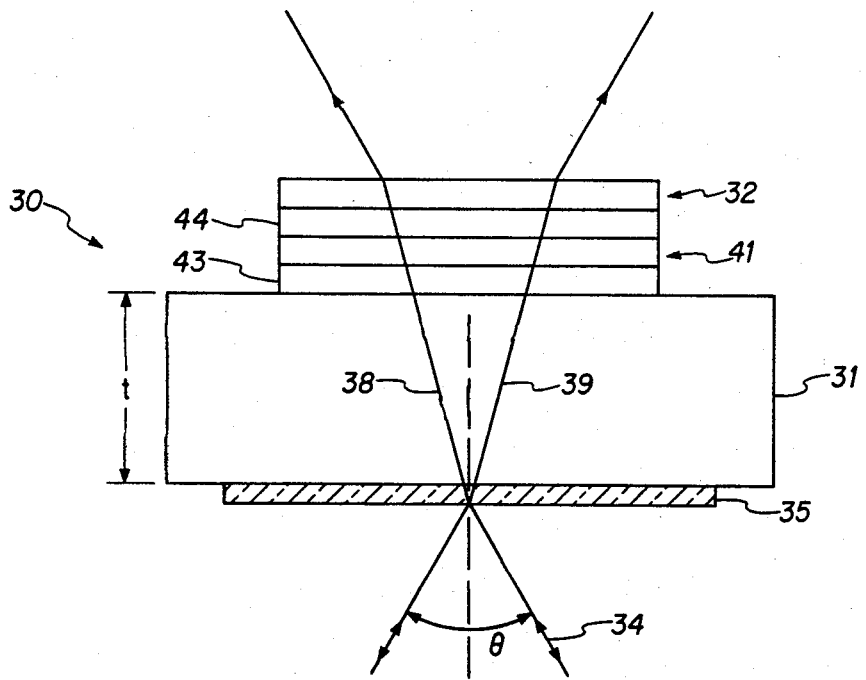
FIG. 2 is a side elevational view of an output detector structure, in accordance with the present invention, for developing the outputs of a ring laser gyroscope.
Figure 3:
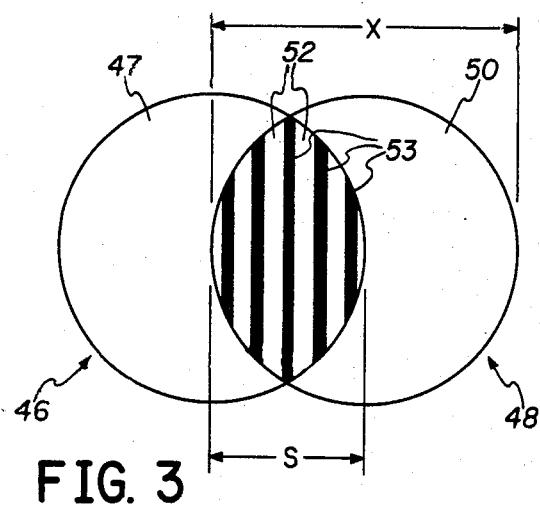
FIG. 3 is a plan view of the beam pattern such as may be developed at the detector surface of the detector structure of FIG. 2, in accordance with the present invention.

An improved detector structure 30 in accordance with a preferred embodiment of the invention is diagramatically illustrated in FIG. 2, and includes a substrate 31 on which a detector element 32, below described in detail, is carried. A multilayer dielectric reflective coating 35 is provided on the front surface of the substrate 31. The multilayer dielectric reflective coating 35 is partially reflective and partially transmissive to reflect the counter rotating light beams following the path 34 within the laser cavity (not shown), and to transmit a portion of the respective beams along paths 38 and 39 onto the detector 32, as will be described below. Since the multilayer dielectric reflective coating 35 is on the front face of the substrate 31, displaced a distance "t" from the prior art in which the multilayer dielectric reflective coating was provided on the back face of the substrate (see FIG. 1), the divergent paths 38 and 39 will produce an out of registration beam pattern on the detector 32, as shown in FIG. 3 described below. It should be noted that in the prior art, the goal was to bring the two beam patterns into registration, in contradistinction to the out of registration locations sought in the operation of the detector 30 of the present invention. The structure of the detector 30 additionally includes a mask 41, described below with reference to FIG. 4, having on each side thereof anti-reflection isolator coatings 43 and 44. The thickness of the mask 41 and the coatings 43 and 44 is about 1000 Angstroms, while the thickness of the multilayer dielectric reflective coating 35 is about 20,000 Angstroms. Thus, the mask 41 and coatings 43 and 44 will cause almost a negligible additional spreading of beams 38 and 39 before their impinging on the detector 32. The relationship between beam centers and thickness t is given essentially by Equation (1):

$$S = 2t \tan\left[\sin^{-1}\left(\frac{\sin(\theta/2)}{n}\right)\right] \qquad \text{Equation (1)}$$

where:
S is the distance between the centers of the beam patterns;
t is the substrate thickness;
n is the mirror substrate refractive index; and
$\theta$ is the angle between the incoming and outgoing beams incident upon the multilayer dielectric reflective coating 35.

As mentioned, the emplacement of the multilayer dielectric layer 35 on the front face of the substrate 31 produces out of registration beam patterns of the counter rotating beams, as shown in FIG. 3. Thus, for example, one of the beam patterns 46 has a first portion 47 which does not overlap the beam pattern 48 of the other counter rotating beam upon the detector surface 32. Likewise, the beam pattern 48 of the other counter rotating light beam has a portion 50 which is not overlapping the beam pattern 46 of the first beam. The beams have a central overlapping portion 52 which produces interference fringes 53 which move at a rate dependent upon the frequency difference of the counter rotating light beams producing the patterns 46 and 48. The rate and direction of movement of the fringes 53 is indicative of the rate and direction of rotation of the gyroscope with which the detector is associated in the same manner as in prior art gyroscopes having beam patterns in total registration. It will be appreciated, however, that in addition to the fringe patterns 53 developed, which represent the frequency difference between the beams, the nonoverlapping portions 47 and 50 of the beam patterns represent the respective intensities of the individual counter rotating light beams. It should be appreciated that depending upon the physical sizes and alignment of the various parts of the ring laser gyroscope (not shown) and the detector 30, the beam pattern may be as illustrated with the respective beams out of alignment or registration along a horizontal axis, as shown, with the fringes being produced essentially along vertical bars or stripes.

Figure 5:
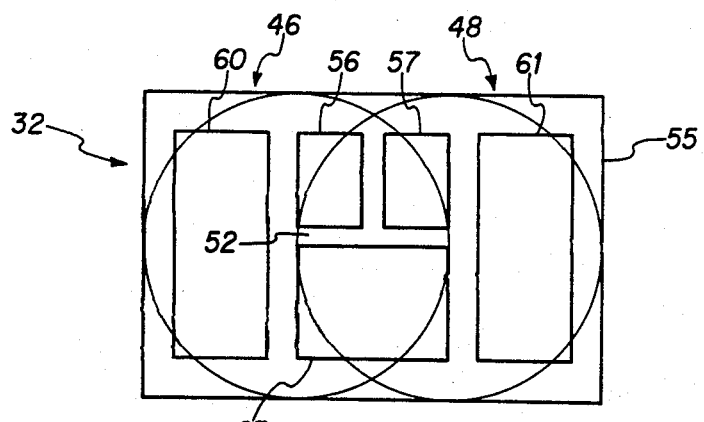
FIG. 5 is a plan view of a detector arrangement, in accordance with the present invention, for use in the detector structure of FIG. 2.

With reference now to FIG. 5, the detector 32 is formed upon a base or substrate 55, adapted to be carried on the detector structure 30 in a manner to enable the offset or out of registration beam patterns 46 and 48 to fall thereupon generally as indicated. (In FIG. 5, the pattern of the interference fringes produced in the overlapping portions of the beam patterns 46 and 48 have been omitted, for clarity in illustrating the detector structure, and it is to be understood that the interference fringes would exist, if shown, in the overlapping region 52 in the manner illustrated in FIG. 3, described above.)

It is noted that all the desired data can be obtained by causing the intensity pattern shown in FIG. 3 to fall on a detector array with proper geometry. The two single beam intensities can be obtained from the two non-overlap regions. A fringe pattern is produced in the overlap region, with fringe spacing D, where:

$$D = \frac{\lambda}{2 \sin(\theta/2)} \qquad \text{Equation (2)}$$

where:

D is the fringe spacing; and
λ is the operating wavelength.

The gyroscope count readout as well as the total intensity information is available from this central overlap region.

As an example of the magnitude of various quantities for a typical ring laser gyroscope, a reasonable beam dimension, X, as shown in FIG. 3, is 0.045 inches. For a beam center separation S of 0.020 inches with $\theta=60$ degrees, and the substrate refractive index n=1.5, the substrate thickness t is found to be 0.028 inches from Equation (1). The fringe spacing for a ring laser gyroscope operating at the 0.633 micron line in the helium-neon system is 25 micro-inches.

The detectors emplaced on the substrate 55 can be located generally as indicated, with heterodyning detectors 56 and 57 at least partially within the area 52 of beam overlap. Intensity detectors 60 and 61 are provided in the nonoverlapping areas of the beam patterns 46 and 48, from which signals representative of the respective individual beam intensities of the beams 46 and 48 can be derived. Finally, a detector 63 is provided substantially within the overlapping beam area 52 to provide an intensity indication of the sum of the intensities of the two beams 46 and 48. All of the detectors emplaced on the substrate 55 are electrically isolated from each other.

Figure 4:
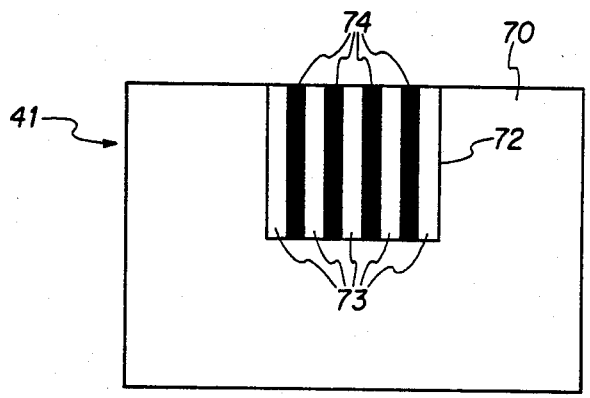
FIG. 4 is a plan view of a mask for use with the detector of FIG. 2, in accordance with the present invention.

The mask 41 implaced between the detector 55 and substrate 31 upon which it is carried is shown in FIG. 4 and includes a first transparent region 70 through which light of the beams can pass to fall upon the respective detectors 60, 61 and 63, as above described. A region 72 is provided in registration with the detectors 56 and 57 through which the light within the overlapping region 52 passes to reach the respective detectors 56 and 57. The region 72 of the mask 41 includes a plurality of nontransmitting bars or stripes 74 configured in the same direction as the interference fringes of the overlapping beam patterns 46 and 48 (see FIG. 3). The bars or stripes 74 produce alternating regions which are transmitting and nontransmitting to the light falling on them.

The lines 73 and 74 of the mask 41 vary only slightly in width from the fringe light and dark lines, so that over the total area of the heterodyning detectors 56 and 57, the mask lines 73 and 74 will be uniformly spaced the same as the fringe pattern, plus or minus one dark line 73.

As the ring laser rotates in its plane, the fringe pattern will move across the mask, and the light intensities on detectors 56 and 57 will alternate in accordance with the resultant beat frequency generated by the two counter-rotating beams. This beat frequency is representative of the angular rate of motion of the ring laser in its sensitive plane and gives rise to the output signals from each of the two detectors 56 and 57. The detectors are spaced such that their signals are 90 degrees out of phase and therefore can be used to determine rate and direction of angular motion in the ring laser's sensitive plane.

The various detectors 56, 57, 60, 61, and 63 can be fabricated in a manner which is similar to that used in the construction of prior detector devices, and the various signals derived from the detectors processed in a fashion similar to that used to process the various signals of prior devices derived from the various individual detector elements throughout the gyroscope.

Although the invention has been described and illustrated with a certain degree of particularity, it is understood that the present disclosure has been made by way of example only and that numerous changes in the combination and arrangement of parts may be resorted to by those skilled in the art without departing from the spirit and scope of the invention as hereinafter claimed.

I claim:

1. A detector structure for use in a ring laser gyroscope of the type having counter rotating light beams having a frequency difference indicating the rate and sense of rotation of the gyroscope about an axis of rotational sensitivity, comprising:

a partially reflective surface for passing a portion of each of the beams therethrough and reflecting a portion of each of the counter rotating beams into a light path of the laser gyroscope, a detector element spaced with respect to said partially reflective surface to receive the portions of the beams passing the partially reflective surface with patterns formed by the respective beams only partially overlapping, first detector means on said detector element disposed to receive at least a non-overlapping portion of each of the beam patterns, thereby providing an intensity indication of the respective beams, and second detector means on said detector element having at least two side-by-side detectors and a mask, each detector being disposed to receive at least an overlapping portion of the beams, said beams passing through said mask for detecting the motion of interference fringes produced by the respective beams and for providing an indication of at least a frequency difference between said beams.

2. The detector of claim 1 further comprising:

a third detector means having a single detector on said detector element disposed to receive at least an overlapping portion of the beams for providing an indication of the sum of the intensities of the respective beams.

3. The detector structure of claim 1 wherein said second detector means further comprises:

said mask being located between the at least two side-by-side detectors and said partially reflective surface and comprising alternate transmitting and non-transmitting bars;

whereby the interference fringes fall alternately onto said transmitting and non-transmitting bars to generate a frequency and sense indicating signal in the at least two side-by-side detectors.

4. The detector structure of claim 1 or 3 wherein said second detector means comprises two detectors.

5. The detector structure of claim 1 wherein said first detector means comprises two detector elements each located on said detector substrate to receive light from a respective one of said beam patterns which are not overlapping to provide respective indications of the intensity of each respective beam.

6. A detector structure for use in a ring laser gyroscope of the type having counter rotating light beams having a frequency difference indicating the rate and sense of rotation of the gyroscope about an axis of rotational sensitivity, comprising:
 a partially reflective surface for passing a portion of each of the beams therethrough and directly reflecting a portion of each of the counter rotating beams into a light path of the laser gyroscope,
 a detector substrate spaced with respect to said partially reflective surface to receive the portions of the beams passing the partially reflective surface with patterns formed by the respective beams only partially overlapping,
 first detector means on said detector substrate disposed to receive nonoverlapping portions of each of the beam patterns, thereby providing an intensity indication of the respective beams,
 a second detector element on said detector substrate disposed to receive at least an overlapping portion of the beams for detecting the motion of interference fringes produced by the respective beams, thereby providing an indication of at least a frequency difference between said beams and a sense of rotation of the gyroscope,
 a mask located between said second detector and said partially reflective surface and comprising alternate transmitting and non-transmitting portions on a portion thereof, whereby when the interference fringes move, they fall alternately onto said transmitting and non-transmitting portions to generate a frequency indicating signal in the second detector
 and a third detector on the detector substrate located to receive at least an overlapping portion of the beams, thereby providing an indication of the sum of the intensities of the respective beams.

7. The detector structure of claim 6 further comprising a substrate of optically transmissive material for carrying said partially reflective surface on one side and for carrying said detector substrate and mask on another side.

8. The detector structure of claim 7 further comprising anti-reflection isolator coatings on each side of said mask.

9. The detector structure of claim 6 wherein said second detector comprises two side by side detector elements located on said substrate under said mask whereby both side by side detector elements are substantially within the overlapping portions of the beam patterns.

10. A detector structure for use in a ring laser gyroscope of the type having counter rotating light beams having a frequency difference indicating the rate and sense of rotation of the gyroscope about an axis of rotational sensitivity, comprising:
 a partially reflective surface located to receive light from the counter rotating beams within a light path of the laser gyroscope at a single point thereof, for passing a portion of each of the beams and reflecting a portion of each of the counter rotating beams into the light path,
 a substrate on which the partially reflective surface is carried, said substrate being of an optically transmissive material,
 a detector substrate spaced with respect to said partially reflective surface to receive the portions of the beams passing the partially reflective surface and said optically transmissive substrate, whereby patterns formed by the respective beams only partially overlap,
 a mask located between the detector substrate and said optically transmissive substrate, and comprising alternate transmitting and non-transmitting sections over a portion thereof, whereby as the interference fringes produced in said partially overlapping beam patterns move, they fall alternately onto said transmitting and non-transmitting sections,
 first detector means on said detector substrate disposed to receive at least a nonoverlapping portion of each of the beam patterns, thereby providing an intensity indication of the respective beams,
 and second detector means on said detector element disposed to receive the light passing said transmitting portion of said portion of said mask having transmitting and non-transmitting portions, for detecting the motion of interference fringes produced by the respective beams, thereby providing an indication of at least a frequency difference between said beams and the sense of rotation of the gyroscope.

11. The detector of claim 10 wherein said first detector means comprises two detector elements each located on said detector substrate to receive light from a respective one of said beam patterns which are not overlapping to provide respective indications of the intensity of each respective beam.

12. The detector or claim 10 further comprising a third detector means on the detector element disposed to receive at least an overlapping portion of the beams without being blocked by said mask, thereby providing an indication of the sum of the intensities of the respective beams.

* * * * *